United States Patent [19]
Hayashi

[11] Patent Number: 5,960,631
[45] Date of Patent: Oct. 5, 1999

[54] SUPERCHARGING PRESSURE CONTROL DEVICE

[75] Inventor: Takashi Hayashi, Susono, Japan

[73] Assignee: Toyota Jidosha Kabushiki Kaisha, Toyota, Japan

[21] Appl. No.: 08/783,235

[22] Filed: Jan. 14, 1997

[30] Foreign Application Priority Data

Jan. 16, 1996 [JP] Japan .................................. 8-005083

[51] Int. Cl.⁶ .................................................. F02B 37/18
[52] U.S. Cl. ............................................................ 60/602
[58] Field of Search ...................... 60/600, 603; 123/564

[56] References Cited

U.S. PATENT DOCUMENTS

| | | | | |
|---|---|---|---|---|
| 4,848,086 | 7/1989 | Inoue et al. | ................................ | 60/602 |
| 4,849,897 | 7/1989 | Ciccarone | .................................. | 60/602 |
| 5,363,652 | 11/1994 | Tanaka et al. . | | |
| 5,605,044 | 2/1997 | Zimmer et al. | ........................... | 60/602 |

FOREIGN PATENT DOCUMENTS

| | | |
|---|---|---|
| 57-157016 | 9/1982 | Japan . |
| 59-168222 | 9/1984 | Japan . |
| 60-19919 | 2/1985 | Japan . |
| 60-128930 | 7/1985 | Japan . |
| 62-95133 | 6/1987 | Japan . |
| 2-176117 | 7/1990 | Japan . |
| 5-106455 | 4/1993 | Japan . |
| 6-10686 | 1/1994 | Japan . |

*Primary Examiner*—Michael Koczo
*Attorney, Agent, or Firm*—Oliff & Berridge, PLC

[57] ABSTRACT

According to the supercharging pressure control device of the present invention, a supercharging pressure of a supercharged engine for an aircraft is controlled by adjusting an opening of a waste gate valve (WGV) of an exhaust gas turbocharger. The control device controls the opening of the WGV to the opening given as a sum of a feed forward amount determined from an atmospheric pressure and an engine speed, and a feedback amount set based on a deviation between a target supercharging pressure and an actual supercharging pressure detected by a sensor. Further, the control device corrects the feed forward amount in accordance with the deviation amount of the atmospheric temperature and an intake air pressure loss from the values in the standard condition and makes the range of fluctuation of the feedback amount smaller. By this, the lowering of a response of the supercharging pressure control due to an increase of the amount of the correction of the degree of opening of the WGV by the feedback amount caused by the deviation of the operating condition from the standard condition is prevented.

12 Claims, 10 Drawing Sheets

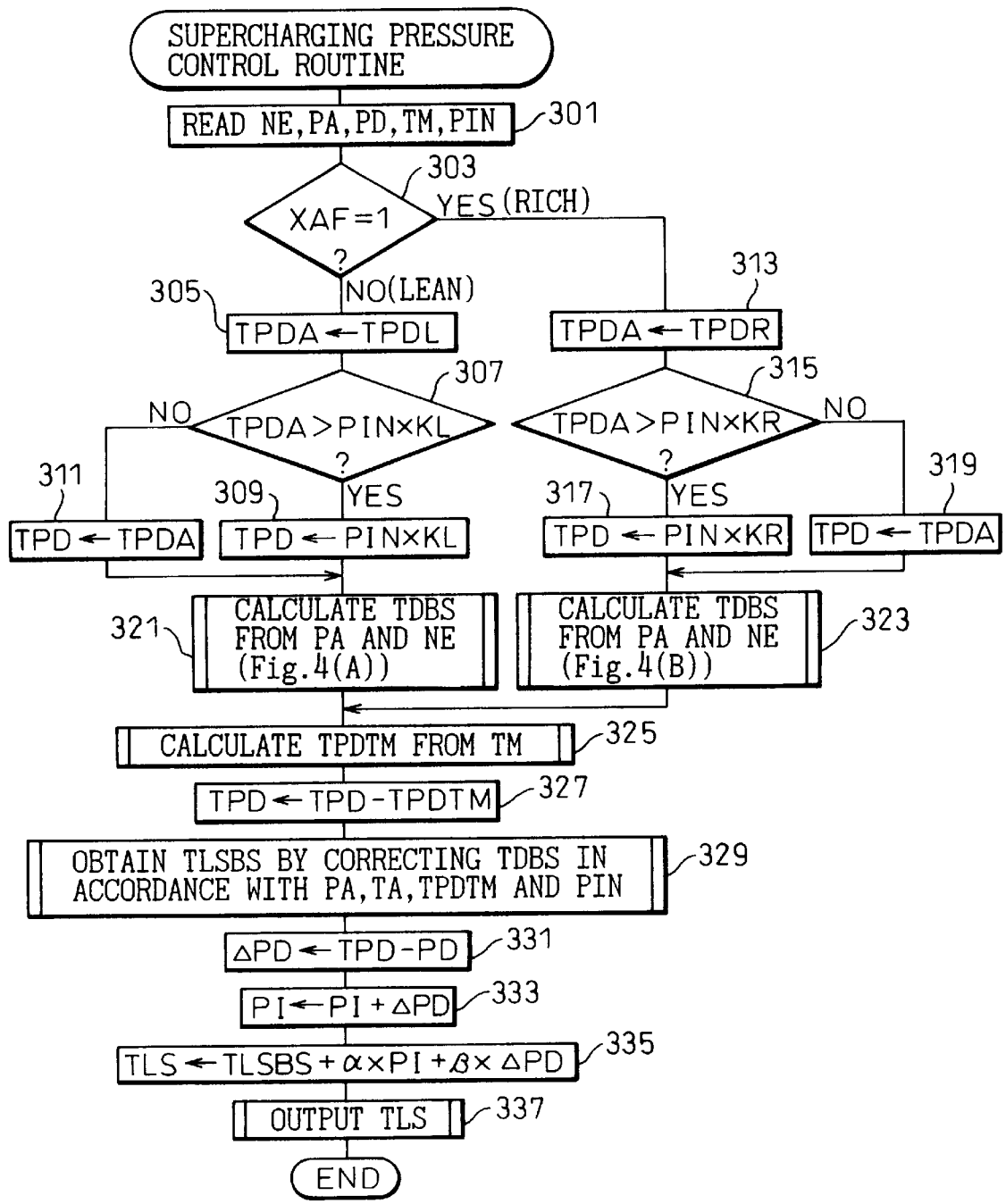

SUPERCHARGING PRESSURE CONTROL DEVICE

BACKGROUND OF THE INVENTION

1. Field of the Invention The present invention relates to a supercharging pressure control device for a supercharger.

2. Description of the Related Art

In general, in an internal combustion engine for an aircraft which is equipped with a supercharger, the supercharging pressure is controlled by changing the degree of opening of a waste gate valve disposed in the exhaust gas passage of the engine.

An example of this type of supercharging pressure control device, is disclosed in, for example, Japanese Unexamined Patent Publication (Kokai) No. 6-10686.

The device disclosed in the above publication controls a degree of opening of a waste gate valve of a supercharger (exhaust gas turbocharger) by using both of a feed forward control (open loop control) and a feedback control in order to adjust the supercharging pressure of a supercharged engine for an aircraft to a target supercharging pressure with a good response and good precision. Namely, the device of the above publication determines a waste gate valve opening setting (feed forward amount) for bringing the supercharging pressure substantially into coincidence with the target value from a predetermined numerical map based on the operating condition parameters of the supercharger other than the supercharging pressure such as an atmospheric pressure, engine speed (that is, an intake air amount), and engine air-fuel ratio. Further, in the device of the same publication, a waste gate valve opening correction amount (feedback amount) is calculated based on a deviation between the actually detected supercharging pressure and the supercharging pressure target value and the waste gate valve opening is set as a sum of the feed forward amount and the feedback amount.

In the supercharging pressure control device of the above publication, the opening of the waste gate valve is given as the sum of the feed forward amount determined by the open loop control without regard to the actual supercharging pressure and the feedback amount determined by the feedback control based on a difference between the actual supercharging pressure and the target supercharging pressure by using the values of the atmospheric pressure, engine speed, engine operating air-fuel ratio, etc. Therefore, when the actual supercharging pressure coincides with the target supercharging pressure at the waste gate valve opening setting (feed forward amount) given from the numerical map, the opening correction amount (feedback amount) becomes zero.

Since the feed forward amount is determined from the numerical map, and therefore, even in a case where the turbocharger intake pressure, intake amount, etc. change, a feed forward amount is set to a value corresponding the conditions after the change in a very short time.

The numerical map for calculating the feed forward amount is prepared based on a case where there is no (change in the engine performance and the turbocharger performance due to aging and, in addition, the engine is operated under standard operating conditions (for example, a standard atmospheric temperature, standard intake pressure loss of the turbocharger, etc.). Therefore, for example, when aging occurs in the performances of the engine and turbocharger, the feed forward amount obtained from the numerical map, i.e., the waste gate valve opening setting will deviate from the actual operating condition. Namely, if the waste gate valve opening is determined by only the feed forward amount, a steady deviation will sometimes be produced between the actual supercharging pressure and the target supercharging pressure.

On the other hand, the feedback amount is determined based on the deviation between the actual supercharging pressure and the target supercharging pressure. Therefore, even in a case where the performance of the turbocharger etc. changes, the feedback amount, i.e., the waste gate valve opening will be adjusted until the supercharging pressure coincides with the target supercharging pressure. However, when the rate of change of the feedback amount is made too large, the control becomes unstable, therefore it is necessary to set the rate of change of the feedback amount relatively small. For this reason, if the waste gate valve opening is controlled by only the feedback amount, there is a problem that a relatively long time will be required until the supercharging pressure is made to converge to the target supercharging pressure when the change in operating conditions of the turbocharger and the engine is large.

Therefore, in the device of the above publication, the above problem is solved by giving the sum of the feed forward amount and the feedback amount as the opening command value of the waste gate valve. Namely, in the device of the above publication, if the operating conditions such as the engine intake air amount and atmospheric pressure are changed, the waste gate valve opening is set according to the feed forward amount determined from the numerical map, and the supercharging pressure is immediately controlled to the vicinity of the target supercharging pressure. At the same time, the steady deviation of the actual supercharging pressure from the target supercharging pressure produced due to the change of the engine performance is corrected by a feedback amount set based on the difference between the actual supercharging pressure and the target supercharging pressure. Usually, the steady deviation is relatively small, and the feedback amount changes to the value appropriate for correcting the deviation in a short time. Therefore, by setting the waste gate valve opening as the sum of the feed forward amount and the feedback amount as described above, it becomes possible to make the supercharging pressure converge to the target pressure with a good precision while maintaining a good response with respect to change.

However, it is found that a problem occurs in which the response of the supercharging pressure control drops when the feed forward amount is determined from a numerical map set based on the standard operating condition of the engine as in the device of the above Japanese Unexamined Patent Publication No. 6-10686. Namely, as mentioned above, the feed forward amount is set based on the standard operating condition (standard atmospheric temperature and standard intake pressure loss), therefore where the conditions, for example, the atmospheric temperature and intake pressure loss, are largely changed from the standard condition, the feed forward amount per se also becomes a value largely deviated from the optimum value. Also in this case, the actual supercharging pressure can be correctly adjusted to the target supercharging pressure by the feedback amount, but if the deviation of the feed forward amount is large, the opening correction amount of the waste gate valve according to the feedback amount becomes large in response to this. For this reason, the converging time of the supercharging pressure becomes long, and there occurs a case where the control response is degraded. Particularly, in the case of an engine for aircraft, the change of the atmospheric conditions is large and the actual operating condition sometimes largely deviates from the standard condition and, therefore, the deviation of the feed forward amount also sometimes becomes large. Therefore, the problem explained above is liable to occur.

SUMMARY OF THE INVENTION

In view of the problems in the related art as set forth above, the object of the present invention is to provide a supercharging pressure control device with which a good response of the supercharging pressure control can be maintained even if the engine operating condition is deviated from the standard condition.

This object is achieved by a supercharging pressure control device, according to one aspect of the present invention, which comprises supercharger operating condition detecting means for detecting operating condition parameters of a supercharger other than a supercharging pressure and including at least an atmospheric pressure and an atmospheric temperature, supercharging pressure controlling means for setting the supercharging pressure control amount based on the detected operating condition parameters and a predetermined target supercharging pressure, control amount correcting means for correcting the supercharging pressure control amount set by the supercharging pressure controlling means based on the detected atmospheric pressure and atmospheric temperature, and supercharging pressure adjusting means for changing the supercharging pressure of the supercharger in accordance with the supercharging pressure control amount after the correction.

Further, according to another aspect of the present invention, there is provided a supercharging pressure control device for a supercharger which raises a pressure of air and supplies the air to a device to be supercharged, the supercharging pressure control device comprising supercharger operating condition detecting means for detecting operating condition parameters of the supercharger other than the supercharging pressure, supercharging pressure controlling means for setting the supercharging pressure control amount based on the detected operating condition parameters and the predetermined target supercharging pressure, intake pressure loss detecting means for detecting the supercharger intake air pressure loss, control amount correcting means for correcting the supercharging pressure control amount set by the supercharging pressure controlling means based on the detected intake air pressure loss, and supercharging pressure adjusting means for changing the supercharging pressure of the supercharger in accordance with the supercharging pressure control amount after it is corrected.

In the present invention, the supercharging pressure control amount for controlling the supercharging pressure is set based on the predetermined target supercharging pressure and the values of the operating condition parameters representing the supercharger operating condition other than the supercharging pressure without use of the actually detected supercharging pressure. The supercharging pressure adjusting means controls the actual supercharging pressure in accordance with this supercharging pressure control amount.

If the supercharging pressure control amount is set without regard to the actually detected supercharging pressure of the supercharger in this way, there is a concern that the set supercharging pressure control amount per se will no longer match the actual operating condition due to a change of the operating condition of the supercharger etc. Therefore, in the present invention, the supercharging pressure control amount is corrected in accordance with the change of a factor exerting an influence upon the operating condition of the supercharger, in order to obtain a waste gate valve opening in accordance with the change of the actual supercharger operating condition.

Namely, in one aspect of the present invention, the supercharging pressure control amount is controlled in accordance with the atmospheric pressure and the atmospheric temperature which are factors exerting an influence upon the performance of the supercharger, and the supercharging pressure is adjusted in accordance with the supercharging pressure control amount after the correction, therefore the supercharging pressure is controlled in accordance with the change of the performance of the supercharger due to the change of the atmospheric pressure and the atmospheric temperature.

Further, in another aspect of the present invention, the supercharging pressure control amount is corrected in accordance with the value of the intake pressure loss which is a factor exerting an influence upon the performance of the supercharger, and the supercharging pressure is adjusted in accordance with the supercharging pressure control amount after the correction, therefore the supercharging pressure is controlled in accordance with the change of the performance of the supercharger due to the change of the intake pressure loss.

BRIEF DESCRIPTION OF THE DRAWINGS

The present invention will be better understood from the description as set forth hereinafter, with reference to the accompanying drawings in which:

FIG. 3 is a flowchart explaining an embodiment of a supercharging pressure control operation of the present invent ion;

DESCRIPTION OF THE PREFERRED EMBODIMENT

Figure 1:
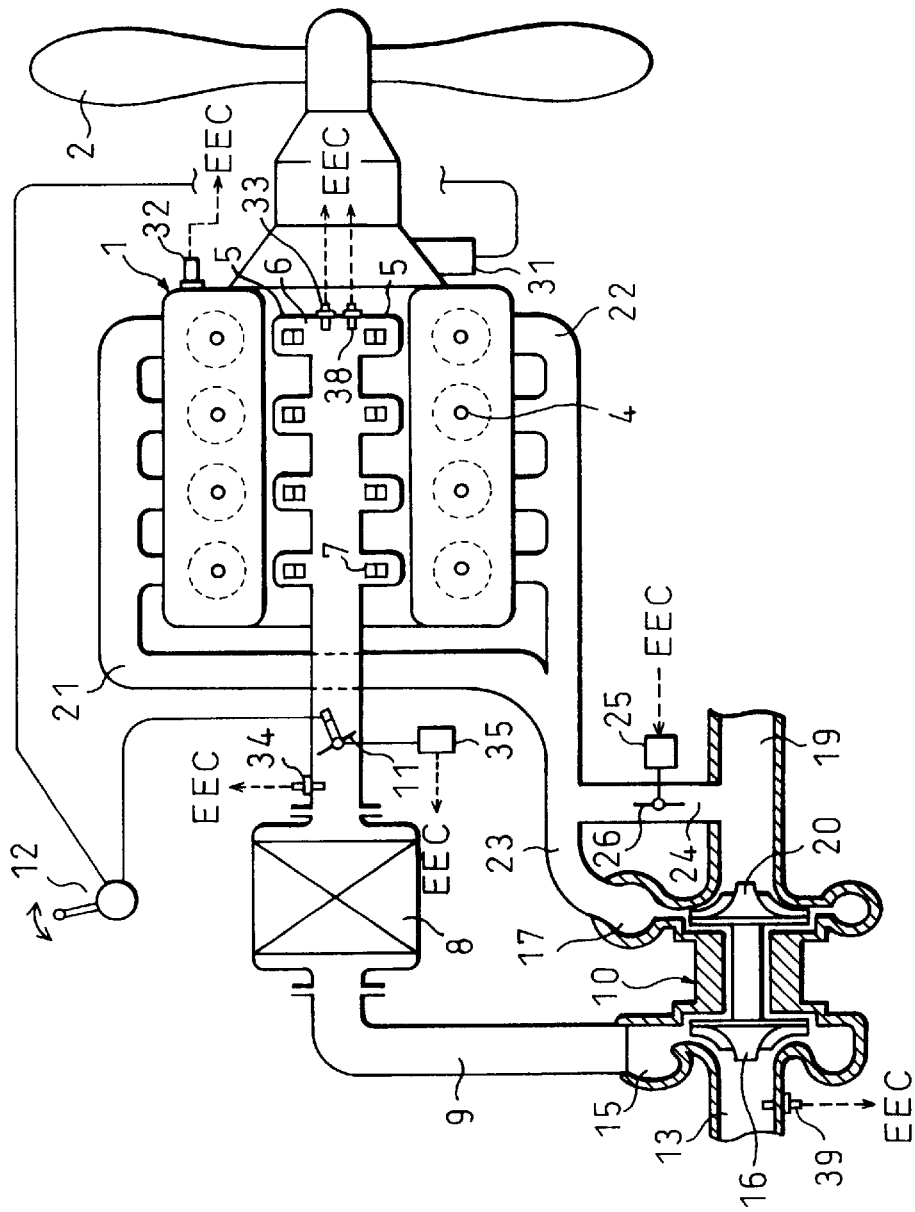
FIG. 1 schematically illustrates the general configuration of an embodiment of the present invention when applied to a supercharged aircraft engine.

FIG. 1 is a view of the general configuration of an embodiment of a supercharging pressure control device of the present invention when applied to a supercharged internal combustion engine for aircraft. In FIG. 1, reference numeral 1 designates an internal combustion engine and 2 designates a propeller driven by the engine 1. In this embodiment, a multi-cylinder (in FIG. 1, a V type 8-cylinder) 4-cycle reciprocating engine is used for the engine 1. Reference numeral 5 in FIG. 1 designates an intake manifold connecting the intake ports of the cylinders of the engine 1 to a common intake duct 6. Near the connecting portions of the intake ports of the cylinders of the intake manifold are arranged fuel injectors 7 for injecting pressurized fuel into the intake ports of the cylinders.

In FIG. 1, numeral 11 shows a throttle valve arranged in the intake duct 6 downstream of an intercooler 8. The throttle valve 11 is connected to a power lever 12 provided at the pilot's seat by a control cable and assumes a degree of opening according to the amount of operation of the power lever 12. Further, 8 shows the intercooler provided on the intake duct 6, 10 shows an exhaust turbocharger, and 9 an intake duct connecting the discharge port 15 of a compressor 16 of the turbocharger 10 and the intercooler 8.

Further, in FIG. 1, reference numeral 21 and 22 show intake manifolds connecting the exhaust ports of the cylinders of the banks at the two sides of the engine 1 with a common exhaust pipe 23. The common exhaust pipe 23 is connected to the exhaust inlet 17 of the exhaust turbine 20 of the turbocharger 10.

The turbocharger 10 in this embodiment is comprised of a radial compressor 16 and a radial exhaust turbine 20 for driving the compressor 16. The intake air of the engine 1 flows from the air cleaner (not shown) through the air inlet pipe 13 to the compressor 16, in the compressor 16, the air is raised in pressure to become supercharged air and is supplied to the intercooler 8 from the intake duct 9. After being cooled at the intercooler 8, the air passes through the intake duct 6, throttle valve 11, and intake manifold 5, and is supplied to the cylinders of the engine 1.

Further, the exhaust gas of the engine 1 passes from the exhaust manifold 21 and 22 through the exhaust pipe 23 and flows from the exhaust inlet 17 to the turbine 20. This exhaust gas drives the rotation of the turbine and the compressor 16 connected to the same, then is discharged from the exhaust outlet pipe 19.

Further, in this embodiment, an exhaust bypass passage 24 is provided for connecting the exhaust pipe 23 and the exhaust outlet pipe 19 of the turbine 20. In the exhaust bypass passage 24 is provided a waste gate valve 26 for controlling the flow rate of the exhaust gas bypassing the exhaust turbine 20 from the bypass passage 24 and flowing to the exhaust outlet pipe 19. When the waste gate valve (hereinafter, referred to as "WGV") 26 is fully closed, the entire amount of the exhaust gas from the engine 1 flows to the turbine 20, so the speed of the turbocharger 10 rises and the outlet pressure of the compressor 16 becomes high (the outlet pressure of the compressor (i.e., the supercharging pressure) is hereinafter referred to as "deck pressure"). On the other hand, when the WGV 26 opens, part of the exhaust gas of the engine 1 bypasses the turbine 20 and flows out to the exhaust outlet pipe 19, so the flow rate of the exhaust gas passing through the turbine 20 drops. Therefore, the speed of the turbocharger 10 falls and the deck pressure falls in accordance with the degree of opening of the WGV 26. That is, by adjusting the degree of opening of the WGV 26, it is possible to make the deck pressure of the engine 1 and the speed of the turbocharger 10 fall to a desired level.

In the embodiment of FIG. 1, the WGV 26 is driven by an actuator 25 comprised of a DC servomotor. The actuator 25 operates in accordance with an opening command signal from a later mentioned electrical engine controller (EEC) 30 (FIG. 2) and controls the WGV 26 to a degree of opening in accordance with the opening command signal from the EEC 30. Note that, as the actuator 25, it is also possible to use an actuator other than a DC servomotor so long as it can drive the WGV 26 to the degree of opening in accordance with the opening command signal from the EEC 30. For example, it is also possible to use a stepping motor or an electrical/hydraulic pressure type actuator etc.

In this embodiment, the propeller 2 driven by the engine 1 is a variable pitch propeller, and a speed governor 31 for controlling the propeller pitch of the propeller 2 is provided. In this embodiment, the propeller governor 31 is a centrifugal type governor and is connected to a drive shaft of the propeller through a rotation transmission shaft (not shown). The propeller governor 31 acts to adjust the propeller pitch so that the engine speed (propeller speed) matches the speed setting. That is, when the propeller speed becomes higher than a speed setting, the governor 31 makes the propeller pitch increase and increases the power absorbed by the propeller so as to cause the engine speed to drop. Further, when the propeller speed becomes lower than the speed setting, the governor 31 reduces the propeller pitch and causes the power absorbed by the propeller to decrease so as to cause the engine speed to increase. By this, the propeller speed (engine speed) is controlled to match the speed setting of the propeller governor 31. In this embodiment, the speed governor 31 and the throttle valve 11 are connected to a common power lever 12 via respective control cables. Therefore, by operating this single power lever 12, it is made possible to simultaneously control both of the degree of opening of the throttle valve 11 (engine output) and the engine speed (pitch of propeller 2). In this embodiment, the control cables for controlling the throttle valve 11 and governor 31 are connected to the power lever through cams having shapes determined in accordance with the aerodynamic characteristics of the aircraft body. Therefore, the characteristics of change of the amounts of operation of the throttle valve 11 and governor 31 with respect to the amount of operation of the power lever 12 can be set to suitable characteristics to provide the optimal engine output/speed characteristics matching with the aerodynamic characteristics of the aircraft body.

Figure 2:
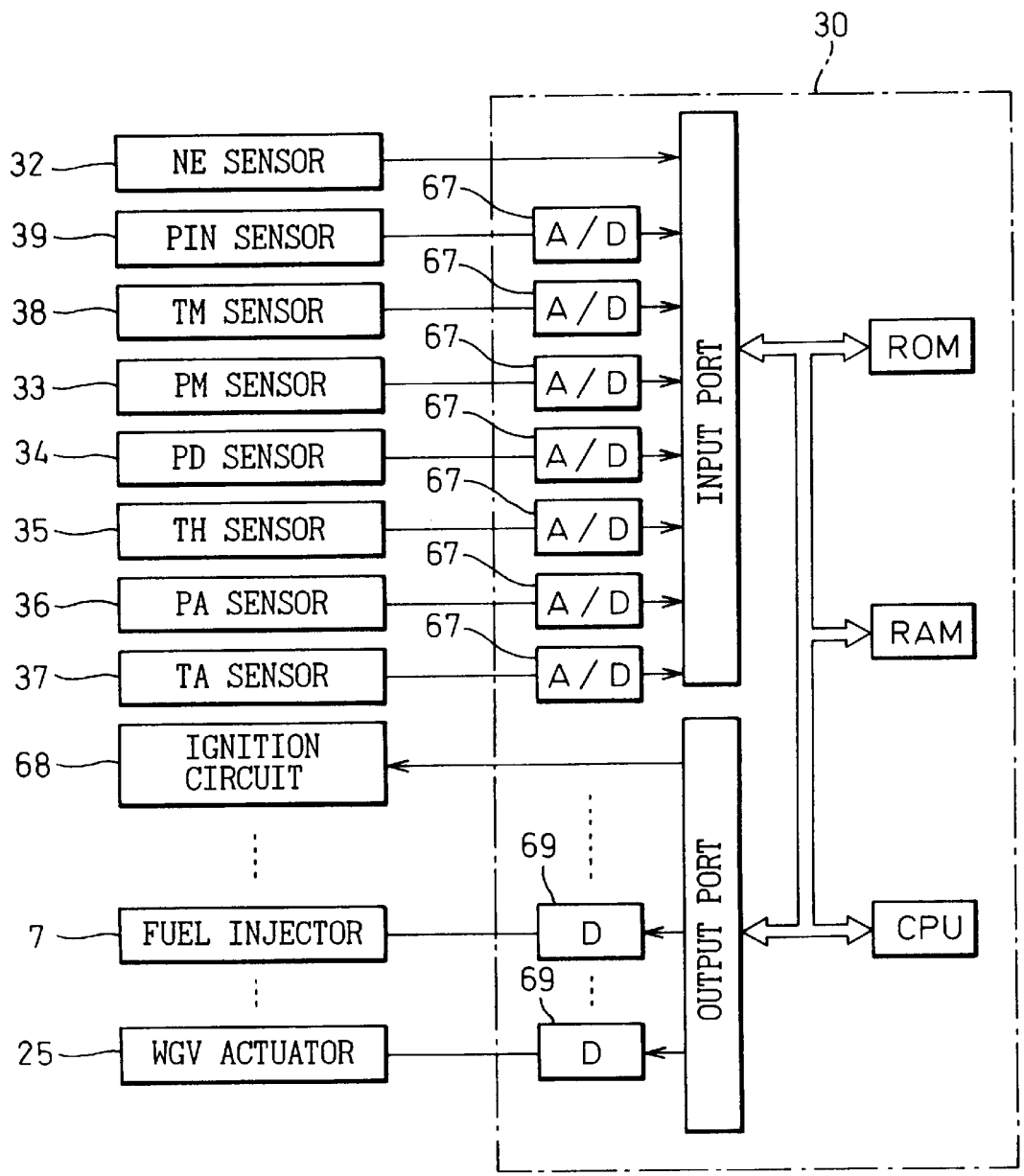
FIG. 2 is a block diagram showing the general configuration of a control device of the embodiment of FIG. 1.

FIG. 2 is a view of the configuration of the EEC (electrical engine controller) 30 for controlling the engine 1. As shown in FIG. 2, the EEC 30 in this embodiment is comprised of a microcomputer of a known configuration including a RAM, ROM, CPU, input port, and output port connected with each other by a bi-directional bus. In this embodiment, the EEC 30 performs the control of the fuel injection of the engine 1, the control of the ignition timing, and other basic control and also the later mentioned supercharging pressure control. For these controls, a pulse signal having frequencies proportional to the engine speed NE is supplied to the input port of the EEC 30 from an NE sensor 32 provided on a crankshaft (not shown) of the engine 1. The CPU of the EEC 30 calculates the engine speed NE based on the pulse signal and uses the speed NE for the various control operations mentioned later.

Further, voltage signals from an intake pressure sensor (PM sensor) 33 and an intake air temperature sensor (TM sensor) 38 disposed in the intake duct 6 downstream of the throttle valve 11 which are proportional to the absolute pressure PM and the temperature TM in the intake duct 6, respectively, are supplied to the input port of the EEC 30 through the AD converters 67. Further, a voltage signal proportional to the supercharging pressure (deck pressure) PD (absolute pressure) is supplied to the input port of the EEC from a PD sensor 34 disposed in the intake duct 6 upstream of the throttle valve 11. Further, the input port of the EEC 30 receives as inputs various voltage signals from the respective sensors through the AD converters 67. These signals are: a signal corresponding a degree of opening TH of the throttle valve 11 from a throttle valve opening sensor (TH sensor) 35 disposed in the vicinity of the throttle valve 11, a signal corresponding to a turbocharger intake pressure PIN from a compressor intake pressure sensor (PIN sensor) 39 arranged in the inlet pipe 13 of the turbocharger compressor 16, a signal corresponding to an atmospheric pressure PA and an atmospheric temperature TA from an atmospheric pressure sensor (PA sensor) 36 and an atmospheric temperature sensor (TA sensor) 37, respectively, disposed on the body of the aircraft.

The output port of the EEC 30 is connected to the spark plugs 4 and fuel injectors 7 of the cylinders of the engine 1 through an ignition circuit 68 and drive circuit 69 and controls ignition timing of the engine 1 and the amount and timing of fuel injection. In this embodiment, the EEC 30 determines the optimal fuel injection amount, injection timing, and ignition timing from the intake pressure PM and engine speed NE detected by the Pm sensor 33 and NE sensor 32 based on a numerical table stored in the ROM of EEC 30 in advance. Then, the EEC 30 injects fuel from the fuel injectors 7 and ignites spark plugs 4 in accordance with the determined values.

Further, the output port of the EEC 30 is connected to an actuator 25 of the WGV 26 through the drive circuit 69 and controls the degree of opening of the WGV 26 to control the supercharging pressure as explained below.

Next, the supercharging pressure control performed in the present embodiment is explained.

In the present embodiment, an opening command signal TLS supplied from the EEC 30 to the actuator 25 of the WGV 26 has become the sum of the feed forward amount FF and the feedback amount FB (that is, TLS=FF+FB).

Here, the feed forward amount is determined from the numerical map stored in the ROM of the EEC 30 based on the operating condition parameters such as the compressor intake pressure and the intake amount without regard to the deck pressure (supercharging pressure) actually detected by the PD sensor 34. Further, the feed forward amount is an opening command value for giving a degree of opening of the WGv 26 necessary for maintaining the supercharging pressure PD at the predetermined target supercharging pressure. This target supercharging pressure, however, is the target supercharging pressure in the standard operating condition of the engine 1 and the turbocharger 10 (that is, in a state free from the aging of the performances of the engine 1 and the turbocharger 10 and under the standard atmospheric temperature and standard intake pressure loss in the flying altitudes, as explained later).

On the other hand, the feedback amount is a value determined by the feedback control based on the deviation of the actually detected deck pressure PD and the target supercharging pressure (PI control, that is, proportional integration control, in this embodiment). Accordingly, when the engine 1 and the turbocharger 10 are operated in the standard operating condition, the supercharging pressure becomes the target supercharging pressure by the degree of opening of the WGV 26 given by the feed forward amount only. In this case, since the deviation between the actual supercharging pressure and the target supercharging pressure becomes 0, the feedback amount is set to 0.

Namely, the feed forward amount corresponds to the supercharging pressure control amount in the claims, and the feedback amount corresponds to the second supercharging pressure control amount in the present embodiment.

The feed forward amount is the value determined from the numerical map, therefore even in a case where the compressor intake pressure and the intake amount etc. largely change, the feed forward amount in accordance with the value after the change is set in an extremely short time. However, if the engine performance changes due to aging etc., a steady deviation is produced between the feed forward amount and the degree of opening of the WGV 26 actually required for maintaining the supercharging pressure at the target supercharging pressure. On the other hand, the feedback amount is determined based on the deviation between the actual supercharging pressure arid the target supercharging pressure. Therefore, even if a steady deviation is produced by the change of performance of the engine 1 and the turbocharger 10 etc., the opening of the WGV 26 is adjusted so that the actual supercharging pressure coincides with the target supercharging pressure.

Therefore, in the present embodiment, by giving the sum of the feed forward amount and the feedback amount as the opening command value of the WGV 26, both of an improvement of the response by the feed forward control and an improvement of the control precision by the feedback control are achieved.

Further, in the present embodiment, the feed forward amount determined from the numerical map is further corrected in accordance with the change of the atmospheric temperature and the intake pressure loss, thereby to enhance the control response where the engine operating condition deviates from the standard condition.

Namely, as mentioned above, the feed forward amount is set based on the standard operating condition, therefore where the conditions, for example, the atmospheric temperature and the intake pressure loss, are largely changed from the standard condition, the feed forward amount per se becomes a value largely deviated from the optimum value. Even in this case, the actual supercharging pressure can be correctly converged to the target supercharging pressure by the feedback amount. However, the feedback amount is directed to compensate for a relatively small steady deviation caused by the aging of the performances of the engine 1 and the turbocharger 10, and the rate of change of the feedback amount is set to be relatively small so as to enhance the control stability. For this reason, if the deviation of the feed forward amount due to the change of the operating condition is large, the converging time of the supercharging pressure by the feedback amount becomes long in accordance with the amount of deviation of the feed forward amount, and in some cases, the control response is degraded. In contrast to this, in the present embodiment, by correcting the feed forward amount per se determined from the numerical map based on the change of the operating condition, the feed forward amount becomes a value corresponding to the actual operating condition. Therefore, the correction amount by the feedback amount becomes small, and the control response can be further improved.

Next, a concrete explanation will be made of the supercharging pressure control of the present embodiment by referring to FIG. 3 to FIG. 13.

FIG. 3 is a flowchart showing a basic supercharging pressure control operation of the present embodiment. The present routine is executed at predetermined time intervals by the EEC 30 in FIG. 3, when the routine starts, at step 301, an engine speed NE, an atmospheric pressure PA, an atmospheric temperature TA, a supercharging pressure PD, an intake air temperature TM, and a compressor intake pressure PIN respectively detected at corresponding sensors 32, 36, 37, 34, 38, and 39 are read and fetched.

Subsequently, at, steps 303 to 323, a target supercharging pressure TPD and a feed forward amount TDBS of an opening command value of the WGV 26 are determined in accordance with whether the engine 1 is operated with a lean air-fuel ratio or operated with a rich air-fuel ratio.

In an engine for aircraft, usually, the operating air-fuel ratio of the engine (air-fuel ratio of the air-fuel mixture supplied to the engine combustion chamber) is set to a richer side than the stoichiometric air-fuel ratio in an operation in which the engine maximum output is required such as a take off or landing. This is required to prevent the overheating of elements around the combustion chamber by cooling these elements by the excess fuel. On the other hand, when the aircraft reaches the cruising altitude and the engine starts to be steadily operated, the operating air-fuel ratio of the engine is set to the Leaner side than the stoichiometric air-fuel ratio to reduce the fuel consumption. Namely, in an engine for aircraft, a switching of the operating air-fuel ratio between Lean and rich is carried out, and also the operating characteristics of the engine and the turbocharger change in accordance with the switching of the operating air-fuel ratio. Therefore, in the present embodiment, the target supercharging pressure TPD and the feed forward amount TUBS are determined in accordance with whether the operating air-fuel ratio of the engine is rich or lean.

Namely, at step 303, it is decided from the value of a flag XAF whether the engine 1 is operated with a rich air-fuel ratio or operated with a lean air-fuel ratio at present. Here, XAF is a flag set by a fuel injection amount calculation routine (not illustrated) separately executed by the EEC 30, and XAF=1 indicates that the rich air-fuel ratio operation is being carried out, and XAF=0 indicates that the lean air-fuel ratio operation is being carried out.

In the present embodiment, the target supercharging pressure TPD and the feed forward amount TDBS are set as follows. First, at steps 305 and 313, the temporary target supercharging pressure TPDA is set in accordance with whether the engine operating air-fuel ratio is rich or lean. Here, TPDL and TPDR of steps 305 and 313 are target supercharging pressures when the operating air-fuel ratio is lean and when it is rich, respectively, and are made constant values in the present embodiment. Next, at steps 307 to 311 and steps 315 to 319, it is decided whether or not the pressure ratio of the compressor (ratio of the pressure of the discharged air of the compressor and the pressure of the intake air) exceeds the maximum pressure ratio KL or KR if the supercharging pressure is controlled to the temporary target supercharging pressure TPDA with the present intake air pressure PIN of the compressor 16 read and fetched at step 301 (steps 307, 315). If the pressure ratio exceeds KL or KR, a real target supercharging pressure TPD is set as the product of the inlet air pressure PIN and the maximum pressure ratio KL. (or KR) (steps 309, 317). If the temporary target supercharging pressure TPDA can be achieved by a pressure ratio not more than the maximum pressure ratio KL and KR, the value of the temporary target supercharging pressure TPDA is used as the real supercharging pressure TPD (steps 311, 319).

As described above, the target supercharging pressure is restricted by the maximum pressure ratio of the compressor 16 so as Lo prevent the speed of the turbocharger 10 from exceeding the maximum permissible speed when the supercharging pressure is controlled to the target supercharging pressure TPD. In the present embodiment, the maximum pressure ratio KL and KR at the lean operation and at the rich operation are set as constant values.

At steps 321 and 323, the feed forward amount TDBS is determined in accordance with whether the operating air-fuel ratio is rich or lean. In the present embodiment, TDBS is a value corresponding to the opening of the WGV 26 required for maintaining the supercharging pressure at almost the target supercharging pressure TPD (that is TPDL or TPDR) where the engine and the turbocharger are operated in the standard condition, that is, at a standard atmospheric temperature and intake air pressure loss at the flying altitude, and no aging of the performances of the engine and the turbocharger occurs. As TDBS, values for the Lean air-fuel ratio operation (FIG. 4(A)) and for the rich air-fuel ratio operation (FIG. 4(R)) are stored in advance in the ROM of the EEC 30 as a numerical map of the format shown in FIGS. 4(A) and 4(B) using the compressor intake pressure PIN and the engine speed NE.

The outlet pressure of the compressor 16 is determined by the intake pressure PIN and the intake flow rate of the compressor 16 and the turbocharger speed. Further, the intake air flow rate of the compressor is equal to the engine intake air amount, and the turbocharger speed changes in accordance with the engine exhaust flow rate (that is, the engine intake air amount) and the degree of opening of the WGV 26. On the other hand, the engine intake air amount changes in accordance with the engine speed. Therefore the opening of the WGV 26 necessary for maintaining the outlet pressure of the compressor (supercharging pressure PD) at the target value TPD can be substantially represented as a function of the compressor intake pressure PIN and the engine speed NE. In the present embodiment, the degree of opening of the WGV 26 required to maintain the supercharger at the target value TPD is actually measured in advance by operating the actual engine under the standard intake pressure loss, and changing the engine speed at the atmospheric pressures PA corresponding to the respective flying altitude. These values of the degree of opening of the WGV 26 is stored in the ROM of the EEC 30 in the form of numerical maps based on PA and NE (FIGS. 4(A) and 4(B)). At steps 321 and 323, the command value of the opening of the WGV 26 is determined from these maps based on PA and NE.

Figure 4A:
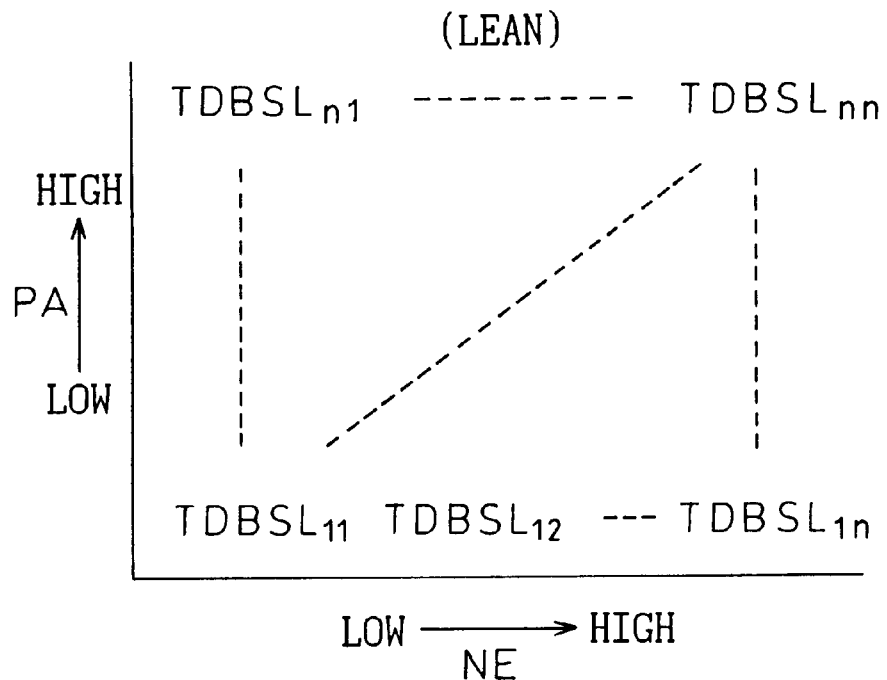
FIGS. 4(A) and 4(B) show the format of numerical maps used in the flowchart of FIG. 3.
Figure 4B:
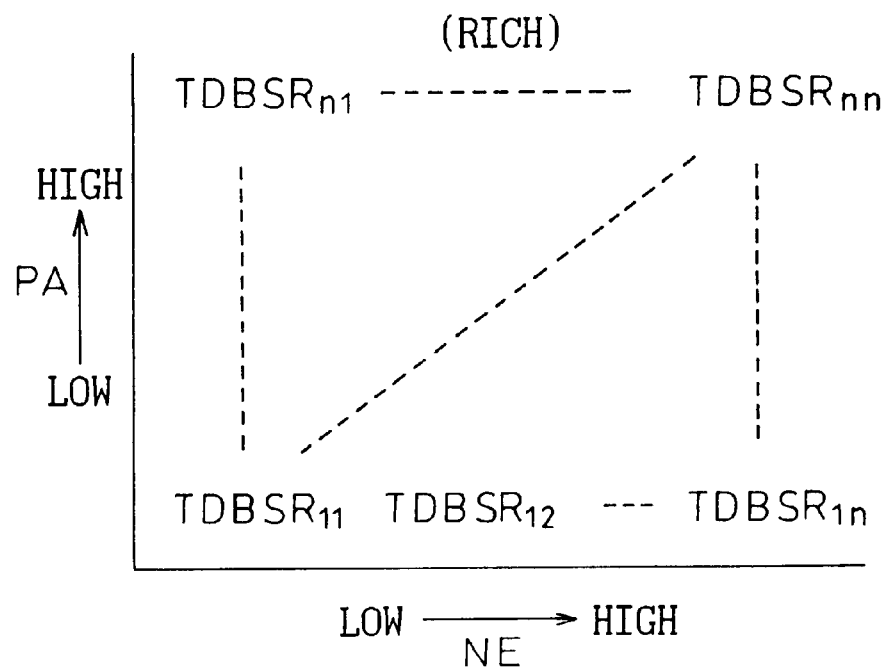

TDBSL and TDBSR in the maps of FIG. 4(A) and FIG. 4(B) represent the feed forward amounts in command values for the opening of the WGV 26 at the lean air-fuel ratio operation and at the rich air-fuel ratio operation, respectively.

After setting the target supercharging pressure TPD and the feed forward amount TDBS, the target supercharging pressure is corrected at steps 325 and 327 in accordance with the intake air temperature TM of the engine 1 detected at the sensor 38. The target supercharging pressure TDP is corrected in accordance with the intake air temperature TM for preventing the intake air amount of the engine 1 from fluctuating due to the change of the intake air temperature. The supercharging air is supplied to the engine 1 after being cooled by the intercooler 8 as shown in FIG. 1., but when the cooling condition of the intercooler 8 changes, also the temperature TM of intake air supplied to the engine 1 changes. For this reason, even if the target supercharging pressure TPD and the other engine operating conditions are the same, the weight flow rate of the air actually taken into the engine 1 is reduced, for example, when the intake air temperature TM rises. In this case, the engine output will be lowered due to the reduction in the intake air weight flow rate. Further, conversely, when the intake air temperature TM is lowered due to a certain cause, the weight flow rate of the air actually taken into the engine 1 is increased. In this case, since the combustion pressure of the engine is increased at the high load operation etc., there is a possibility of lowering of the durability of the engine. Therefore, in the present embodiment, for example, when the intake air temperature TM is high, the target supercharging pressure TPD is corrected at steps 325 and 327 so that also the target supercharging pressure TPD becomes high, and the fluctuation of the engine intake air amount due to the change of the intake air temperature TM is prevented.

The details of correction by the intake air temperature of the target supercharging pressure in steps 325 and 327 will be described later.

Next, at step 329, the value of the feed forward amount TDBS found from the numerical map in the standard condition at steps 321 and 323 is corrected in accordance with the actual operating condition, and the feed forward amount of the final opening command value of the WGV 26 is calculated as the TLSBS. By this correction, even in a case where the feed forward amount TDBS set by the map of FIGS. 4(A) and 4(B) largely deviates due to the change of the actual operating condition, the TDBS starts to be corrected in accordance with the actual operating condition. Therefore, the amount of the opening command value corrected by the feedback amount mentioned later becomes small, and the response of the supercharging pressure control is improved.

The details of step 329 will be explained later.

Steps 331 an(i 333 are steps for the calculation of the feedback amount. In the present embodiment, the feedback amount is calculated by the PI (proportional integration) control based on the deviation ΔPD between the target supercharging pressure TPD and the actual supercharging pressure PD detected by the sensor 34. That is, at step 331, the deviation ΔPD between TPD and PD is calculated, and at step 333, an integrated value of the deviation ΔPD is calculated.

At step 335, the final opening command value TLS of the WGV 26 is calculated as the sum of the feed forward amount (TLSBS) calculated by the above and feedback amount ($\alpha \times PI + \beta \times \Delta PD$). Further, at step 337, the final opening command value TLS calculated by the above is output to the actuator 25 of the WGV 26, and the WGV 26 is driven to the opening in accordance with the opening command value TLS. In the present embodiment, the system is set so that the smaller the value of TLS, the larger the opening of the WGV 26, and when YLS=0, the WGV 26 is 100% open.

In this way, by setting the degree of opening of the WGV 26 as the sum of the feed forward amount set by the feed forward control (open loop control) without regard to the actual supercharging pressure and the feedback amount set in accordance with the deviation between the target supercharging pressure and the actual supercharging pressure by the feedback control, a supercharging pressure control with a high precision and, in addition, with a good response is carried out.

Next, the correction based on the intake air temperature TM of the target supercharging pressure TPD executed at steps 325 and 327 of FIG. 3 is explained. At step 325 of FIG. 3, the intake air temperature correction amount TPDTM is calculated as explained below based on the intake air temperature TM of the engine 1 detected by the sensor 38, and at step 327, the correction amount TPDTM is subtracted from the target supercharging pressure TPD, whereby the target supercharging pressure TPD is corrected.

Figure 5:
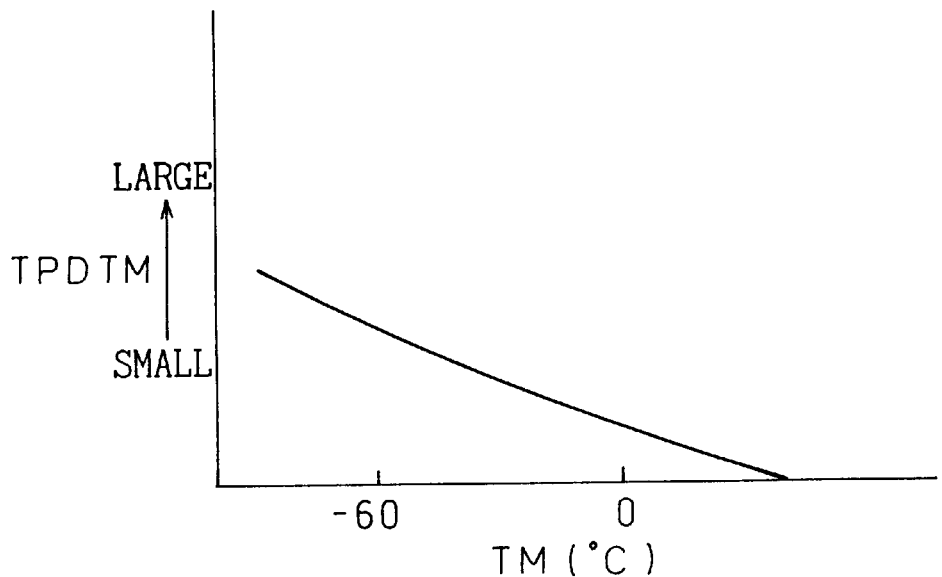
FIG. 5 is a diagram showing the setting of a correction amount used in the flowchart of FIG. 3.

FIG. 5 is a view of a relationship between the intake air temperature TM and the correction amount TPDTM. As shown in FIG. 5, the correction amount TPDTM is set to a smaller value as the intake manifold temperature TM (intake air temperature) is higher. For this reason, the target supercharging pressure TPD after correction is set to a larger value if the temperature TM is higher. When the supercharging pressure rises, even if the other operating conditions are the same, the amount of air (weight flow rate) taken into the engine 1 is increased. Therefore, by setting the correction amount TPDTM as shown in FIG. 5, the reduction of the engine intake amount (weight flow rate) due to the rise in the intake air temperature TM is compensated for, and the lowering of the engine performance due to the rise of the intake air temperature is prevented. The relationship of FIG. 5 is stored in advance in the ROM of the EEC 30 in the form of a one-dimensional numerical map, and at step 325, the value of TPDTM is determined from this numerical map by using the detected value of TM.

Figure 6:
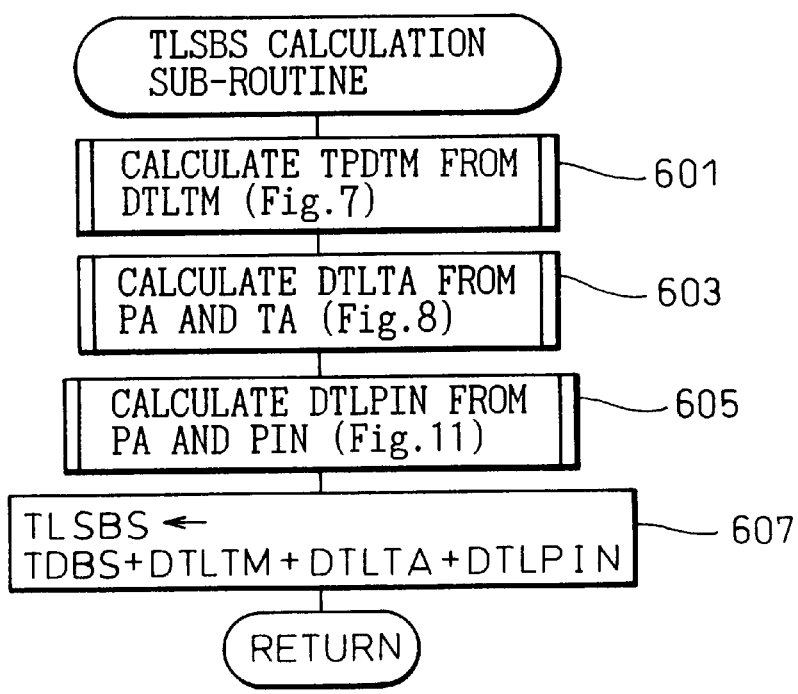
FIG. 6 is a flowchart explaining details of a correction operation executed at step 329 of the flowchart of FIG. 3.

Next, the correction of the feed forward amount TDBS executed at step 329 of FIG. 3 is explained. At step 329, TDBS is corrected in accordance with the value of the operating condition parameters, i.e., the atmospheric pressure PA, atmospheric temperature TA and the compressor intake pressure PIN, and the correction amount TPDTM calculated at step 325 of FIG. 3, and feed forward amount TLSBS of the opening command value after the correction is calculated. FIG. 6 is a flowchart showing a sub-routine executed at step 329 of FIG. 3. In the present sub-routine, the intake air temperature correction amount DTLTM is calculated based on the correction amount TPDTM (step 601), the atmospheric temperature correction amount DTLTA is calculated based on the atmospheric pressure PA and the atmospheric temperature TA (step 603), and the intake pressure loss correction amount DTLPIN is calculated based on the atmospheric pressure PA and the compressor intake pressure PIN (step 605). A detailed description will be made later of the calculation of these correction amounts.

Further, at step 607, the feed forward amount TLSBS of the opening command value after the correction is calculated as:

$$TLSBS = TDBS + DTLTM + DTLTA + DTLPIN$$

By using the correction amount calculated according to the above description and the TDBS found from the map of FIGS. 4(A) and 4(B). By this, the feed forward amount TDBS determined from the numerical maps of FIGS. 4(A) and 4(B) based on the standard condition is corrected based on the deviation of the actual operating condition from the standard condition, therefore the value of the feed forward amount TLSBS of the opening command value after the correction becomes a value very near the degree of opening of the WGV 26 required for obtaining the target supercharging pressure TPD. Accordingly, the opening correction amount of the WGV 26 by the feedback control becomes very small irrespective of the change in the operating condition. Therefore the lowering of response of the supercharging pressure control due to the change in the operating condition is prevented. Note that, in the present embodiment, correction amounts DTLTM, DTLTA, and DTLPIN are initialized to an initial value 0 at the start of the engine.

Next, the respective correction amounts calculated by the sub-routine of FIG. 6 is explained in order.

The intake air temperature correction amount DTLTM calculated at step 601 is a correction accompanying the correction of the target supercharging pressure TPD based on the intake air temperature TM at steps 325 and 327 in FIG. 3. As mentioned before, the value of TDBS determined from the numerical map is a value for bringing the actual supercharging pressure into coincidence with the target value TPD (that is the value set at steps 303 to 319 in FIG. 3) in the respective operating conditions of the supercharger. For this reason, where the target value TPD is changed by the correction, the opening of the WGV 26 cannot be set to the value corresponding to the target supercharging pressure TPD after correction unless the value of the TDBS set from the numerical maps of FIGS. 4(A) and 4(B) are corrected in accordance with the change of the value TPD. Therefore, in the present embodiment, by correcting the feed forward amount TDBS based on the value of the intake air temperature correction amount TPDM of the target supercharging pressure, a feed forward amount corresponding to the target supercharging pressure TPD after correction is obtained.

Figure 7A:
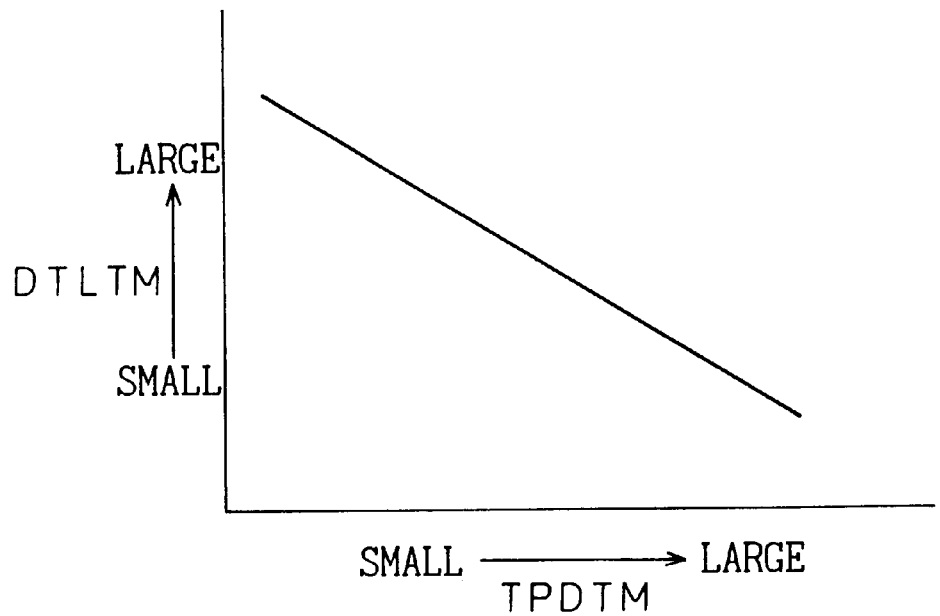
FIGS. 7(A) and 7(B) show the setting of a correction amount used in the flowchart of FIG. 6.

FIG. 7(A) is a view of the relationship of the intake air temperature correction amount TPDTM of the target supercharging pressure TPD and the intake air temperature correction amount DTLTM of the feed forward amount TDBS. As seen from FIG. 7(A), the smaller the correction amount TPDTM (that is as the value of the target supercharging pressure TPD is corrected to increase), the larger the value the DTLTM is set to. As mentioned before, in the present embodiment, the degree of opening of the WGV 26 is set to be reduced as the value of the TLS becomes larger, therefore as the value of the target supercharging pressure TPD is corrected to increase by the above, also the opening of the WGV 26 is set to be smaller in accordance with this, and the supercharging pressure rises.

Figure 7B:
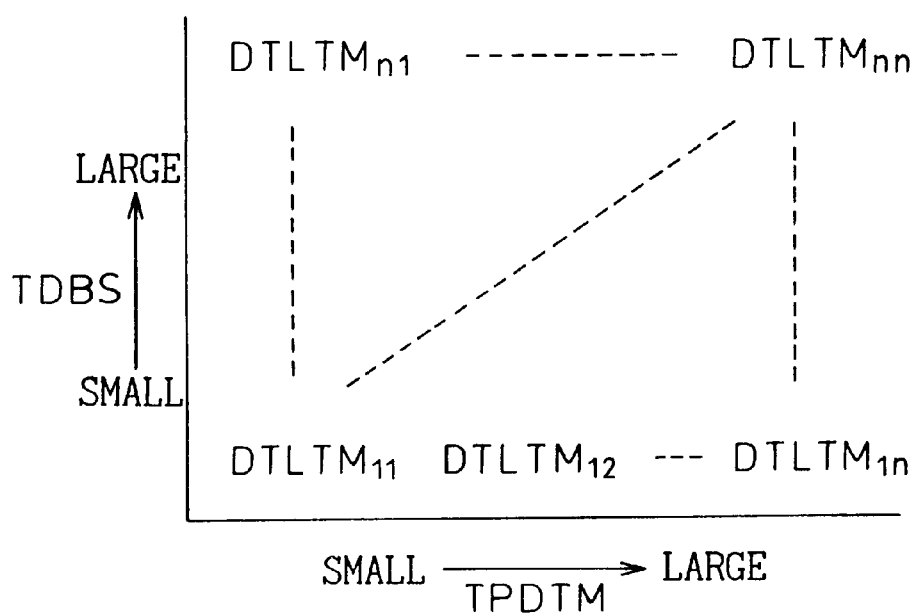

In FIG. 7(A), the value of the DTLTM is determined based on only the correction amount TPDTM. However, since a butterfly valve is used as the WGV 26 in the actual device, the change of the valid flow path sectional area of the WGV 26 with respect to the change of the opening command TDBS differs according to the opening of the WGV 26. Namely, also the opening correction amount DTLTM of the WGV 26 corresponding to the correction amount TPDTM of the target supercharging pressure becomes different according to the opening of the WGV 26. Therefore, it is also possible to find the correction amount DTLTM from a two-dimensional numerical map as shown in FIG. 7(B) by using the feed forward amount TDBS of the command value of the degree of opening of the WGV 26 before the correction other than the correction amount DTLTM of the target supercharging pressure. The map of FIG. 7(B) is prepared by considering the valid effective flow path sectional area changing rate per the unit change amount of the opening command value at the degree of opening of the WGV 26 corresponding to each TDbS. By this, the difference of the rate of change of the valid flow path sectional area by the degree of opening of the WGV 26 is corrected, and the correction amount TPDTM is more correctly calculated.

Next, an explanation will be made of the atmospheric temperature correction amount DTLTA calculated at step 603 in FIG. 6. When the atmospheric temperature TA, that is, the intake air temperature of the compressor 16, is towered, the compression efficiency of the compressor 16 is improved. Therefore, in this case, even if the other conditions are the same, the compressor outlet pressure, that is, the supercharging pressure, rises. On the other hand, as mentioned before, the numerical map used for the calculation of the feed forward amount TDBS is determined based on the standard condition of the engine. This means that, for the atmospheric temperature TA, the numerical map is prepared based on the standard atmospheric temperature TSTD at the different flying altitudes (atmospheric pressures PA). For this reason, where the actual atmospheric temperature is different from the standard atmospheric temperature TSTD, for example where the actual atmospheric temperature is higher than the standard atmospheric temperature TSTPD, when the opening of the WGV 26 is set by the value of the TDBS set at steps 321 and 323 of FIG. 3, the actual supercharging pressure becomes lower than the target supercharging pressure. Therefore, in the present embodiment, by correcting the value of TDBS based on the actual atmospheric temperature TA, the degree of opening of the WGV 26 based on the actual atmospheric temperature TA is obtained. Further, as mentioned above, the numerical map used for the TDBS calculation is prepared based on the standard atmospheric temperature at each atmospheric pressure PA, and therefore also the correction based on the atmospheric temperature TA must be performed in accordance with the deviation of the actual atmospheric temperature TA from the standard atmospheric temperature TSTD. Therefore, in the present embodiment, from the atmospheric pressure PA detected by the sensor 36, the standard atmospheric temperature TSTD at the atmospheric pressure (flying altitude) is calculated, and the value of the TDBS is corrected in accordance with the deviation amount ΔT of the actual atmospheric temperature TA detected by the sensor 37 from the standard atmospheric temperature TSTD.

Figure 8:
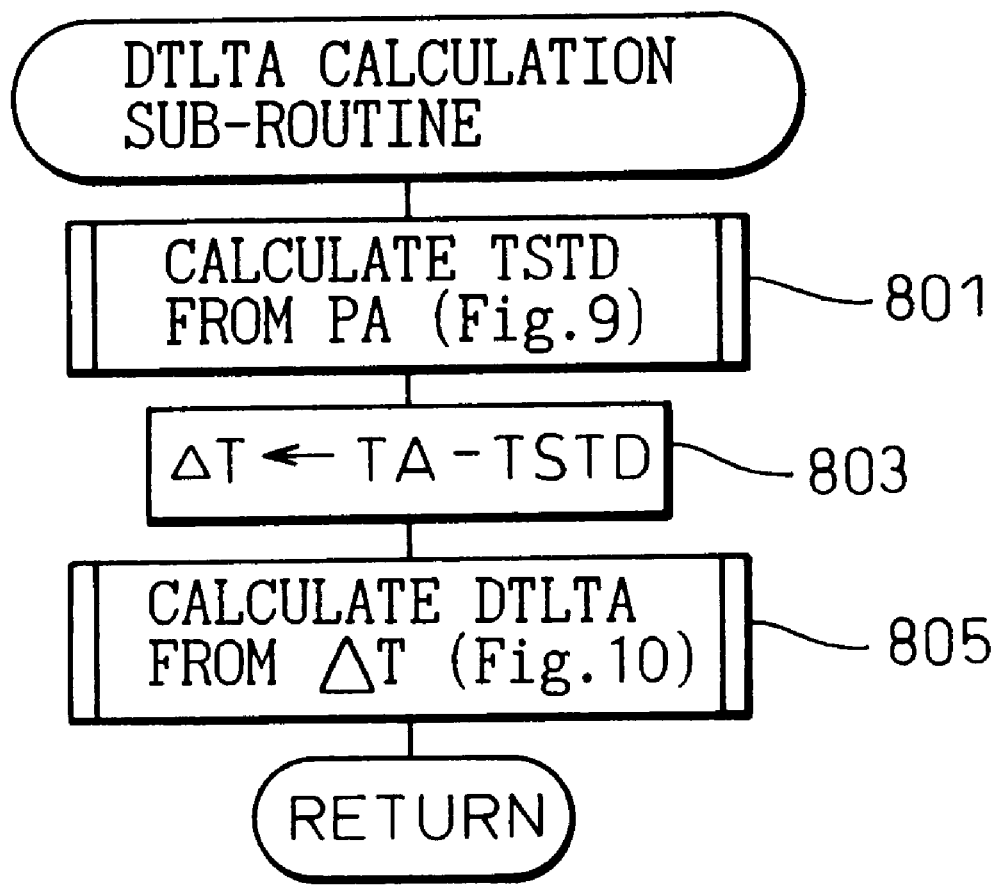
FIG. 8 is a flowchart explaining a calculation operation of the correction amount used in the flowchart of FIG. 6.
Figure 9:
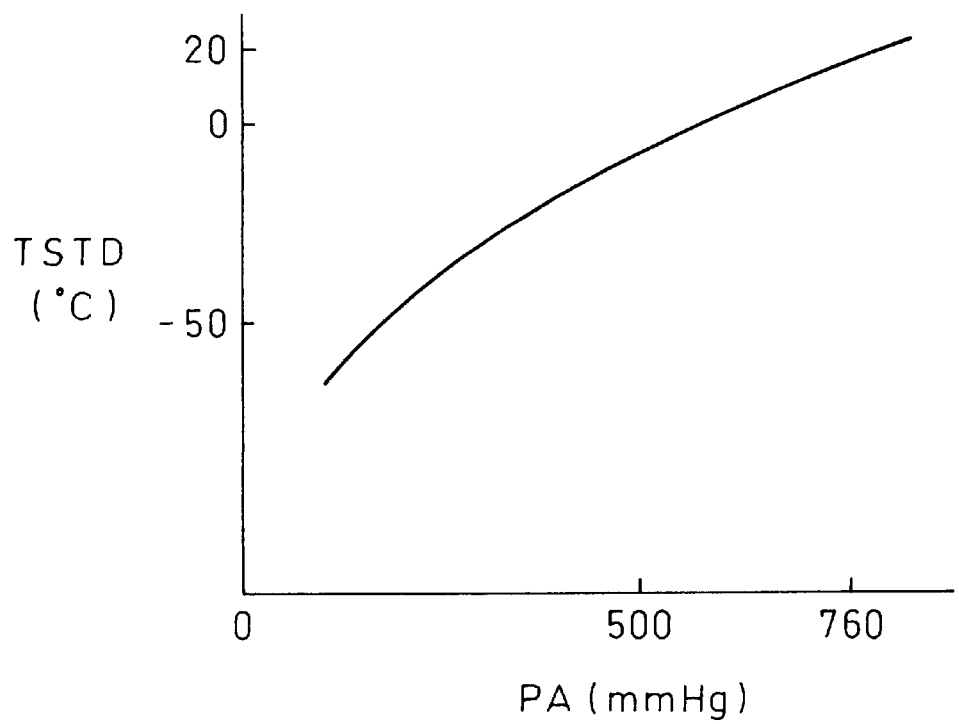
FIG. 9 is a diagram showing the relationship used for the calculation of the correction amount in the flowchart of FIG. 8.

FIG. 8 is a flowchart explaining the calculation subroutine of the atmospheric temperature correction amount DTLTA of step 603 of FIG. 6. In FIG. 8, at step 801, based on the atmospheric pressure PA detected by the sensor 36, the standard atmospheric temperature TSTD used for the correction of TDBS i s calculated. FIG. 9 is a view of a relationship between the atmospheric pressure PA and the standard atmospheric temperature TSTD. As shown in FIG. 9, the standard atmospheric temperature TSTD is lowered as the atmospheric pressure PA becomes smaller (that is the higher the flying altitude).

Further, at step 803 of FIG. 8, a difference ΔT between the actual atmospheric temperature TA detected by the sensor 37 and the standard atmospheric temperature TSTD is calculated as ΔT=TA−TSTD.

Figure 10:
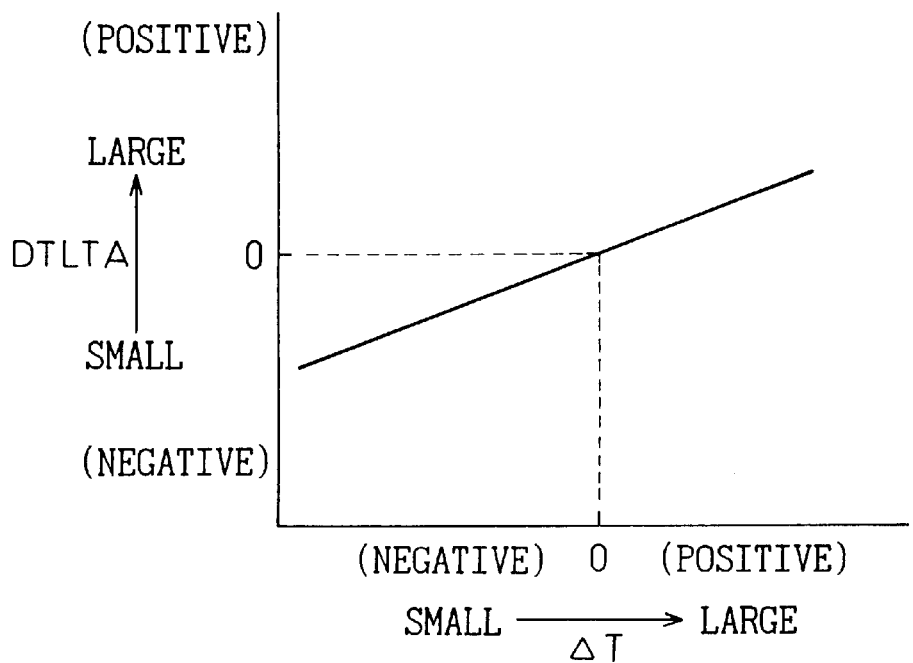
FIG. 10 is a diagram showing the relationship used for the calculation of the correction amount in the flowchart of FIG. 8.

Further, at step 805, the value of the atmospheric temperature correction amount DTLTA is calculated from the relationship shown in FIG. 10 by using the value of the calculated ΔT. As shown in FIG. 10, the value of ΔT becomes larger, that is, as the actual atmospheric temperature TA becomes higher than the standard atmospheric temperature TSTD, the larger the value the atmospheric temperature correction amount DTLPA is set to. For this reason, as the actual atmospheric temperature TA is higher and the outlet pressure of the compressor 16 tends to become lower, the value of the TDBS is larger, that is, the opening of the WGV 26 is corrected to become smaller, and thus the reduction of the supercharging pressure due to the rise of the atmospheric temperature is prevented.

Next, the intake air pressure loss correction amount DTLPIN calculated at step 605 of FIG. 6 is explained. As mentioned before, the feed forward amount TDBS of the opening command value of the WGV 26 is calculated from the numerical map using the atmospheric pressure PA and the engine speed NE of FIGS. 4(A) and 4(B). However, it is not the atmospheric pressure PA, but the intake air pressure PIN of the compressor 16 that actually exerts an influence upon the compressor outlet pressure. The numerical maps of FIGS. 4(A) and 4(B), which are used for the calculation of TDBS, are made on the basis that the intake air pressure loss APIN of the compressor is the standard value. For this reason, even if the atmospheric pressure PA is the same, the actual supercharging pressure becomes lower than the target supercharging pressure when the intake air pressure loss of the compressor 16 becomes the value deviated from the standard pressure loss, for example when the actual intake air pressure loss becomes larger than the standard pressure loss, and if the degree of opening of the WGV 26 is set by the value of TDBS set at steps 321 and 323 of FIG. 3. For this reason, in the present embodiment, by correcting the value of TDBS based on the actual intake air pressure loss APIN, the degree of opening of the WGV 26 based on the actual intake air pressure loss ΔPIN is obtained.

Further, as mentioned above, the numerical map used for the calculation of TDBS is prepared based on the standard pressure loss at the atmospheric pressures PA, and if the atmospheric pressure is different, the standard pressure loss also becomes different. For this reason, in the present embodiment, the value of the current intake air pressure loss ΔPIN is converted to the value DPCR of the pressure loss at a constant reference pressure (reference altitude), and the value of TDBS is corrected based on the difference between this converted pressure loss DPCR and the standard pressure loss at the reference altitude.

Figure 11:
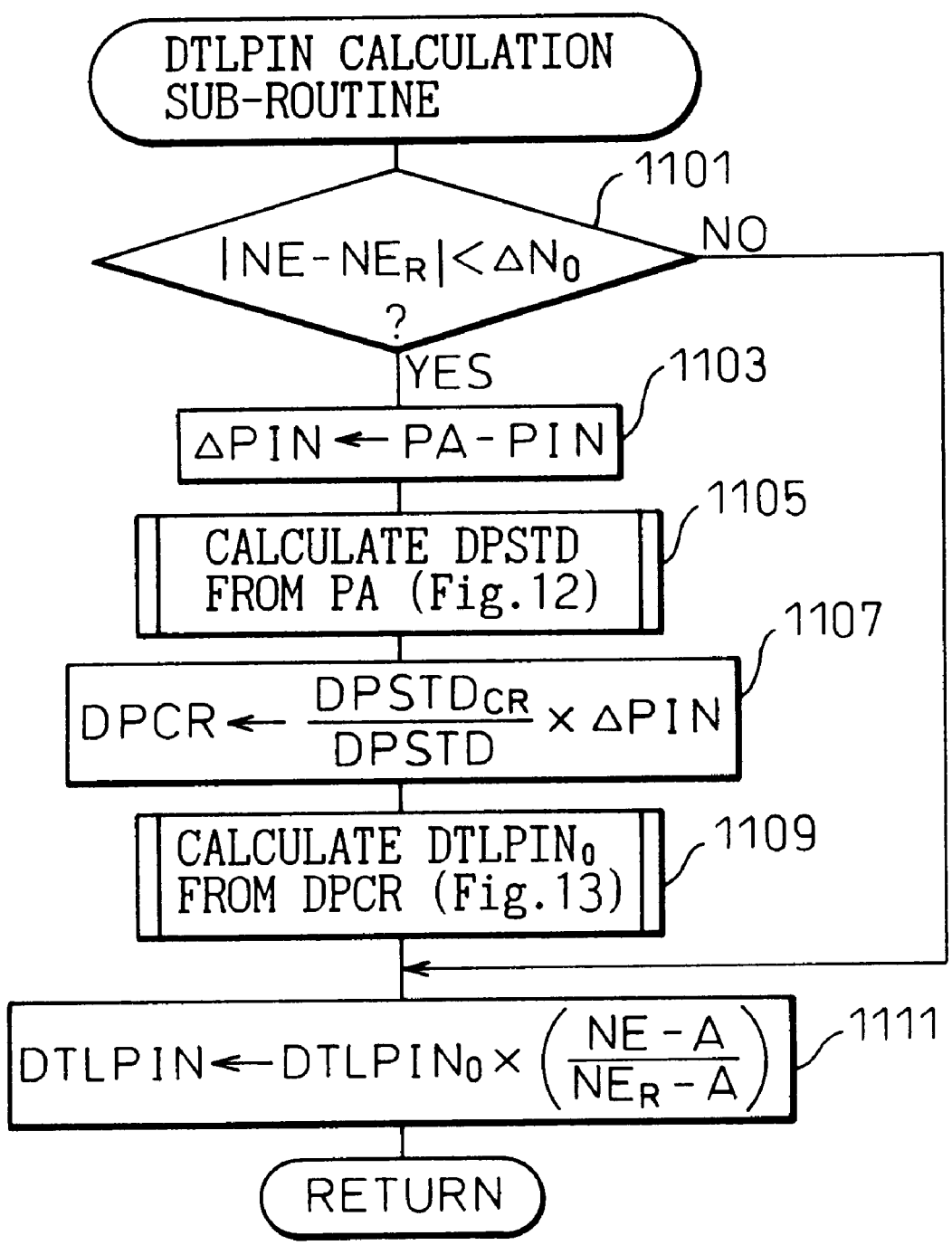
FIG. 11 is a flowchart explaining the calculation operation of the correction amount used in the flowchart of FIG. 6.

FIG. 11 is a flowchart explaining the intake air pressure loss correction amount DTLPIN calculation sub-routine executed at step 605 of FIG. 6. In FIG. 11, when the sub-routine starts, at step 1101, it is decided whether or not the current engine speed NE detected by the sensor 32 is near the rated speed $NE_R$ (at step 1101, $ΔN_O$ is set as the constant value of, for example, about 100 rpm).

At step 1101, if the engine 1 is operated at near the rated speed, at steps 1103 to 1109, the intake air pressure loss correction amount $DTLPIN_O$ is calculated. Namely, at step 1103, the current intake air pressure loss ΔPTN is calculated as ΔPIN=PA-PIN from the atmospheric pressure PA detected by the sensor 36 and the compressor intake pressure PIN detected by the sensor 39. Further, at step 1105, the standard pressure loss DPSTD at this atmospheric pressure is calculated from the current atmospheric pressure PA detected by the sensor 36.

Figure 12:
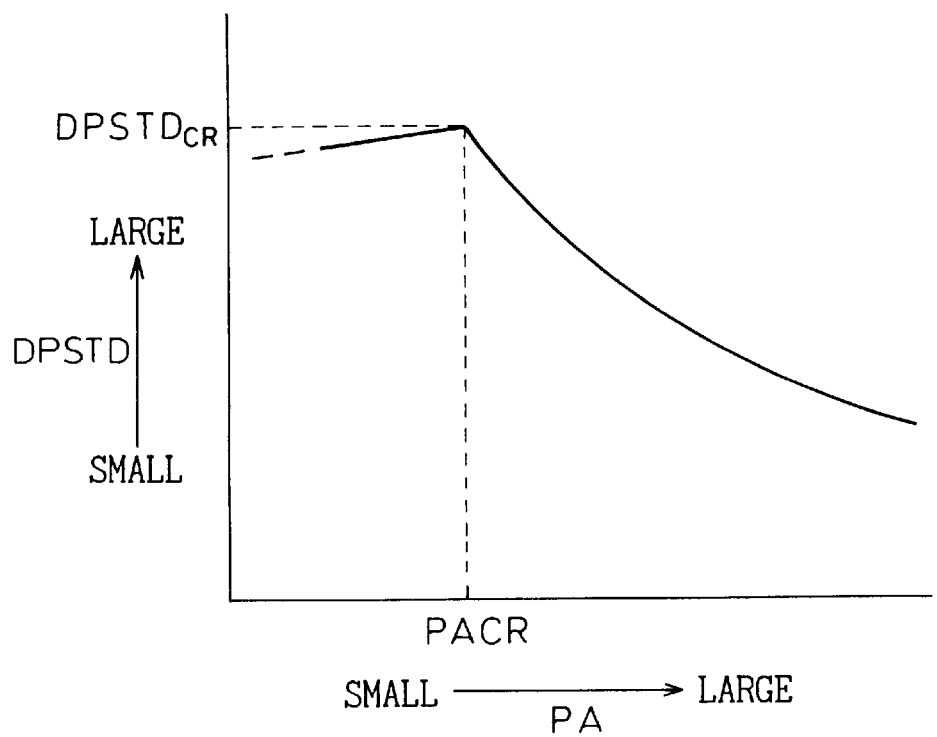
FIGS. 12 and 13 are diagrams showing the relationships used for the calculation of the correction amount in the flowchart of FIG. 11.

FIG. 12 is a view of the value of the standard pressure loss DPSTD at the engine rated speed operation at the atmospheric pressures PA (flying altitudes). The numerical maps of FIGS. 4(A) and 4(B) used for calculating the TDBS is prepared by using the value of the standard atmospheric pressure DPSTD at each atmospheric pressure PA. As shown in FIG. 12, the value of the standard pressure loss DPSTD is increased together with the atmospheric pressure up to a certain atmospheric pressure (atmospheric pressure indicated by PACR in FIG. 12), and lowered as the atmospheric pressure rises at the atmospheric pressure more than PACR. As explained in FIG. 3, in the present embodiment, the supercharging pressure is restricted in such a manner that the pressure ratio of the compressor becomes a constant value or less in order to maintain the turbocharger speed at the maximum permissible speed or less (steps 307 to 311 and steps 315 to 319 of FIG. 3). For this reason, when the flight altitude is increased and the atmospheric pressure is lowered, the supercharging pressure is gradually lowered upon receipt of the restriction of the compressor pressure ratio, and even at the same engine speed, the intake air amount gradually becomes lower. The atmospheric pressure PACR of FIG. 12 is the atmospheric pressure (altitude) at which the restriction of the supercharging pressure by the pressure ratio commences, and the altitude corresponding to this atmospheric pressure is referred to as a critical altitude.

After the standard pressure loss DPSTD at the current atmospheric pressure PA is found from FIG. 12, at step 1107, the value of the current pressure loss ΔPIN calculated at step 1103 is converted to the value DPCR of the pressure loss at the critical altitude by using the standard atmospheric pressure loss DPSTD found in FIG. 12.

The value of the converted pressure loss DPCR is calculated by the following equation.

$$DPCR = (DPSTD_{CR} / DPSTD) \times \Delta PIN$$

Here, $DPSTD_{CR}$ is the standard pressure loss at the critical altitude (atmospheric pressure PACR) (FIG. 12). Namely, the converted value DPCR at the critical altitude of the pressure loss ΔPIN at the current atmospheric pressure is calculated by linear approximation.

Note that, the reference altitude for the conversion of the value of the pressure loss ΔPIN at the critical altitude was set because the intake air pressure loss at the critical altitude exhibits the maximum value (refer to FIG. 12).

Figure 13:
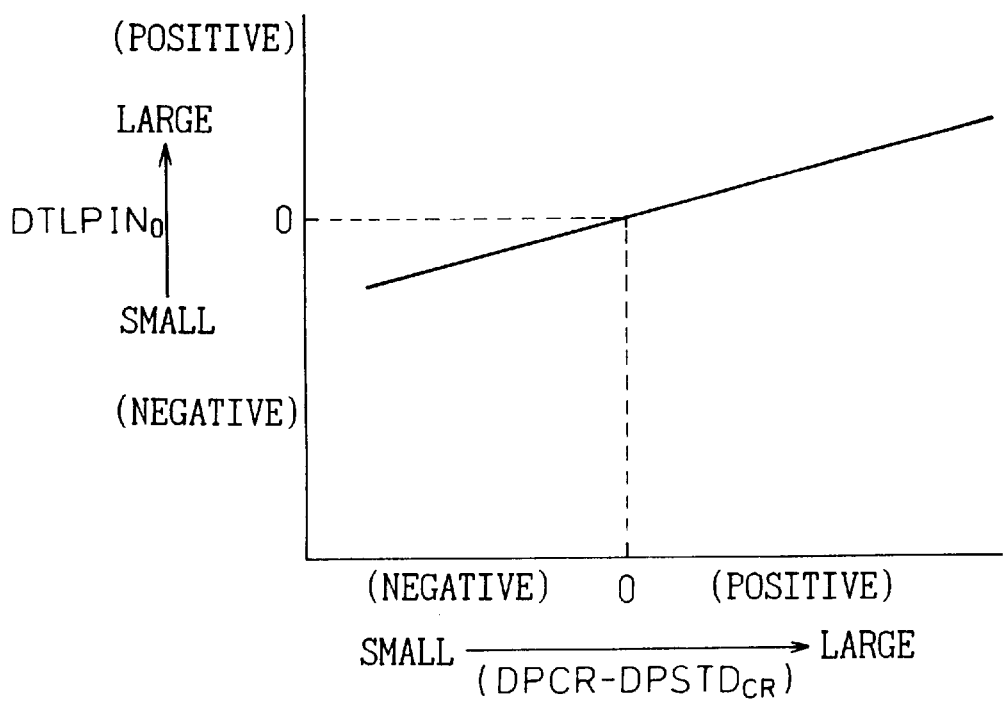

Then, at step 1109 of FIG. 11, the intake air pressure loss correction amount $DTLPIN_O$ at the rated speed $NE_R$ is calculated, by using FIG. 13, from the deviation of the value DPCR of the pressure loss converted to the critical altitude by the above procedure from the standard pressure loss $DPSTD_{CR}$ at the critical altitude. FIG. 13 is a view of the relationship between the deviation of the actual pressure loss from the standard pressure loss at the critical altitude, i.e., $DPCR - DPSID_{CR}$ and the correction amount $DTLPIN_O$. As shown in FIG. 13, as the actual pressure loss DPCR becomes larger than the standard pressure loss (that is, the larger the value of $DPCR - DPSTD_{CR}$), the larger the value of the correction amount $DTLPIN_O$. Therefore, as the intake air pressure loss is increased and the supercharging pressure tends to be lowered, the value of TDBS is corrected to increase, and the degree of opening of the WGV 26 is reduced, and thus the lowering of the supercharging pressure due to an increase of the intake air pressure loss is prevented.

In an aircraft, the longer the operating time, the more the intake air pressure loss is increased due to dirt in the air cleaner etc. Further, in the case of an aircraft, the same type of engines are sometimes mounted on different aircraft bodies. In such a case, since the intake pressure loss differs for every type of aircraft body due to the difference of layout of the intake system, the intake pressure loss is different even though the engine model is the same. Therefore, in an engine for aircraft, there is the possibility that the deviation between the actual pressure loss and the standard pressure loss becomes large. Therefore, when the degree of opening of the WGV is controlled by using the TDBS found from the numerical map based on the standard pressure loss, the correction amount by the feedback control becomes large, and the response of the supercharging pressure control is degraded. In the present embodiment, the feed forward amount TDBS is corrected based on the deviation of the intake air pressure loss from the standard pressure loss as described above, therefore even in a case where the value of the intake air pressure loss is largely deviated from the value of the standard pressure loss, it becomes possible to maintain the correction amount by the feedback control small, and the response of the supercharging pressure control can be maintained high.

In FIG. 11, the correction of the intake air pressure loss is calculated based on the intake air pressure loss correction amount $DTLPIN_O$ when the engine 1 is operated in the vicinity of the rated speed. However, it is also possible to find the relationship shown in FIG. 12 and FIG. 13 in advance in each speed region of the engine and directly calculate the intake air pressure loss correction amount DTLPIN in accordance with the speed of the engine.

Further, in the above embodiment, an explanation was made of the case where the present invention was applied to a supercharged engine for an aircraft, but the present invention is not restricted to the above embodiment. Needless to say it can be applied to other engines equipped with superchargers, for example, engines for vehicle as well.

Further, as the parameters exerting influence upon the opening of waste gate valve, other than the atmospheric temperature and atmospheric pressure etc. mentioned above, other parameters such as an exhaust gas temperature, exhaust gas pressure, a pressure loss of the exhaust system, also exert influence upon the opening of waste gate valve. Accordingly, effects similar to those by the present invention can be obtained even if the waste gate valve opening is feed forward-controlled as explained above, for example, by using the exhaust gas temperature and exhaust gas pressure as parameters in place of the atmospheric pressure and atmospheric temperature in claim 1, and using the exhaust gas pressure loss, etc. as the parameter in place of the intake air pressure loss of the supercharger in claim 3.

As explained above, according to the present invention, by correcting the feed forward amount based on the amount of deviation of the operating condition of the engine from the standard condition, even in a case where the deviation between the standard condition and the actual engine operating condition becomes large, the response of the supercharging pressure control can be maintained high.

I claim:

1. A supercharging pressure control device for a supercharger which raises a pressure of air and supplies the air to a device to be supercharged, said supercharging pressure control device comprising:

supercharger operating condition detecting means for intermittently detecting operating condition parameters of a supercharger during operation including at least an atmospheric pressure and an atmospheric temperature; and supercharging pressure controlling means for setting the supercharging pressure control amount based on the detected operating condition parameters and a predetermined target supercharging pressure;

control amount correcting means for correcting the supercharging pressure control amount set by said supercharging pressure controlling means based on the detected atmospheric pressure and atmospheric temperature; and supercharging pressure adjusting means for changing the supercharging pressure of the supercharger in accordance with the supercharging pressure control amount after the correction.

2. A supercharging pressure control device as set forth in claim 1, wherein said control amount correcting means is provided with standard atmospheric temperature calculating means for calculating a standard atmospheric temperature from the detected atmospheric pressure based on a predetermined relationship, and correcting means for correcting said supercharging pressure control amount based on a difference between the standard atmospheric temperature and the detected atmospheric temperature.

3. A supercharging pressure control device as set forth in claim 1, wherein provision is further made of:

supercharging pressure detecting means for detecting a supercharging pressure of the supercharger;

second supercharging pressure controlling means for setting a second supercharging pressure control amount based on the detected supercharging pressure and said target supercharging pressure; and said supercharging pressure adjusting means changes the supercharging pressure of the supercharger based on the supercharging pressure control amount set by said supercharging pressure controlling means and a second supercharging pressure control amount set by said second supercharging pressure controlling means.

4. A supercharging pressure control device as set forth in claim 3, wherein said supercharger operating condition detecting means is provided with means for detecting the supercharging air temperature supplied to said device to be supercharged;

said second supercharging pressure controlling means is provided with target supercharging pressure correcting means for correcting said target supercharging pressure based on the detected supercharging air temperature; and setting means for setting said second supercharging pressure control amount based on said detected supercharging pressure and the target supercharging pressure after it is corrected.

5. A supercharging pressure control device as set forth in claim 3, wherein said supercharging pressure controlling means sets the supercharging pressure control amount based on only said target supercharging pressure and the operating condition parameters of the supercharger without regard to the detected supercharging pressure; and said second supercharging pressure controlling means sets said second supercharging pressure control amount so that the detected supercharging pressure coincides with the target supercharging pressure.

6. A supercharging pressure control device as set forth in claim 4, wherein said supercharging pressure controlling means sets the supercharging pressure control amount based on only said target supercharging pressure and the operating condition parameters of the supercharger without regard to the detected supercharging pressure; and said setting means sets said second supercharging pressure control amount so that the detected supercharging pressure coincides with the target supercharging pressure after said correction.

7. A supercharging pressure control device for a supercharger which raises a pressure of air and supplies the air to a device to be supercharged, said supercharging pressure control device comprising:

a supercharger operating condition detecting circuit that intermittently detects operating condition parameters of a supercharger during operation including at least an atmospheric pressure and an atmospheric temperature;

a supercharging pressure controlling circuit that sets the supercharging pressure control amount based on the detected operating condition parameters and a predetermined target supercharging pressure;

a control amount correcting circuit that corrects the supercharging pressure control amount set by the supercharging pressure controlling circuit based on the detected atmospheric pressure and atmospheric temperature; and a supercharging pressure adjusting circuit that changes the supercharging pressure of the supercharger in accordance with the supercharging pressure control amount after the correction.

8. A supercharging pressure control device as set forth in claim 7, wherein the control amount correcting circuit includes a standard atmospheric temperature calculating circuit that calculates a standard atmospheric temperature from the detected atmospheric pressure based on a predetermined relationship, and a correcting circuit that corrects the supercharging pressure control amount based on a difference between the standard atmospheric temperature and the detected atmospheric temperature.

9. A supercharging pressure control device as set forth in claim 7, wherein the supercharging pressure controlling circuit is a first supercharging pressure control circuit, further comprising:

a supercharging pressure detecting circuit that detects the supercharging pressure of the supercharger; and a second supercharging pressure controlling circuit that sets a second supercharging pressure control amount based on the detected supercharging pressure and the target supercharging pressure, wherein the supercharging pressure adjusting circuit changes the supercharging pressure of the supercharger based on the supercharging pressure control amount set by the first supercharging pressure controlling circuit and a second supercharging pressure control amount set by the second supercharging pressure controlling circuit.

10. A supercharging pressure control device as set forth in claim 9, wherein the supercharger operating condition detecting circuit is provided with a detecting circuit that detects the supercharging air temperature supplied to the device to be supercharged and the second supercharging pressure controlling circuit includes a target supercharging pressure correcting circuit that corrects that target supercharging pressure based on the detected supercharging air temperature, further comprising:

a setting circuit that sets the second supercharging pressure control amount based on the detected supercharging pressure and the target supercharging pressure after the target supercharging pressure is corrected.

11. A supercharging pressure control device as set forth in claim 9, wherein the supercharging pressure controlling circuit sets the supercharging pressure control amount based on only the target supercharging pressure and the operating condition parameters of the supercharger without regard to the detected supercharging pressure, and the second supercharging pressure controlling circuit sets the second supercharging pressure control amount so that the detected supercharging pressure coincides with the target supercharging pressure.

12. A supercharging pressure control device as set forth in claim 10, wherein the supercharging pressure controlling circuit sets the supercharging pressure control amount based on only the target charging pressure and the operating condition parameters of the supercharger without regard to the detected supercharging pressure; and the setting circuit sets said second supercharging pressure control amount so the detected supercharging pressure coincides with the target supercharging pressure after the correction.

* * * * *